No. 669,744. Patented Mar. 12, 1901.
R. W. ELLIS.
VETERINARY DENTAL FLOAT.
(Application filed July 17, 1900.)
(No Model.)
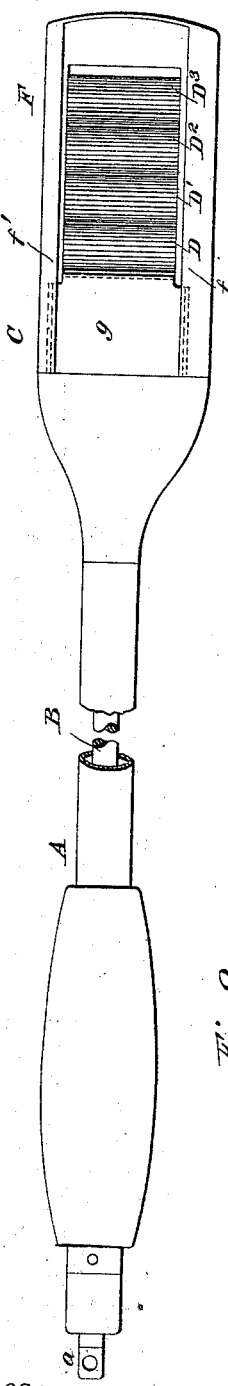
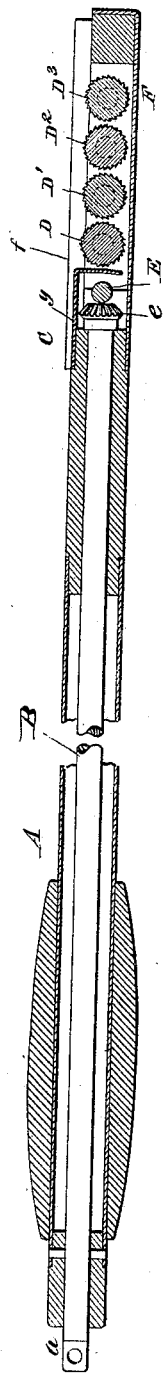
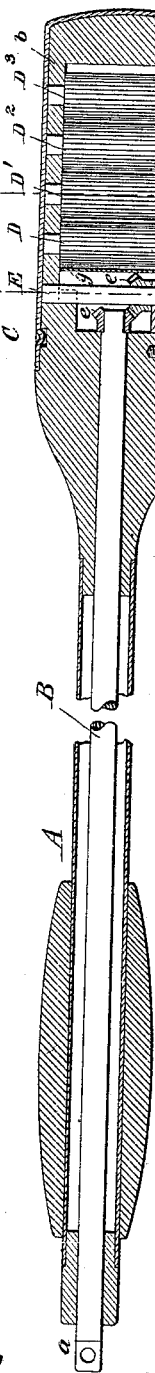
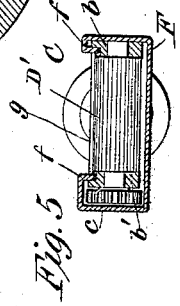
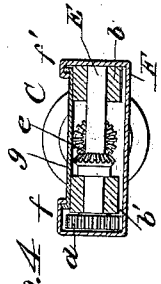
Witnesses:                                        Inventor
                                                  Robert W. Ellis

UNITED STATES PATENT OFFICE.

ROBERT W. ELLIS, OF NEW YORK, N. Y.

VETERINARY DENTAL FLOAT.

SPECIFICATION forming part of Letters Patent No. 669,744, dated March 12, 1901.

Application filed July 17, 1900. Serial No. 23,914. (No model.)

*To all whom it may concern:*

Be it known that I, ROBERT W. ELLIS, a citizen of the United States, residing in the borough of Manhattan, city of New York, county and State of New York, have invented a certain new and useful Improvement in Veterinary Dental Floats, of which the following is a description.

The object I have in view is to produce a veterinary dental float more particularly designed for smoothing and leveling the molar teeth of horses and which will be simple in construction and effective in operation.

In carrying out my invention I provide a handle through which passes a shaft having means for connecting it with a source of power for giving it a movement of rotation. The handle supports a head, which may be constructed in the form of a rectangular frame, and between the side bars of the frame are mounted a series of grinding or cutting rollers having their shafts connected together by a train of spur-gears, which gears are driven by a gear at the end of the train mounted upon a separate cross-shaft, which is connected with the driving-shaft by means of a pair of bevel-gears. The series of grinding-rollers is composed, preferably, of two pairs of such rollers, the rollers of each pair preferably revolving toward each other in operation, although a greater number of rollers might be used, and even one pair of rollers might be employed. The grinding-rollers have their surfaces cut with grinding or cutting teeth or ribs in any suitable way. The grinding or cutting surfaces may be composed of ribs which extend parallel with the axes of the rollers or which extend spirally around such rollers, or the rollers may have cross-cut surfaces. To cover the gears and prevent any of the moving parts except the grinding-rollers from coming in contact with the interior of the horse's mouth, suitable guard-plates are provided.

In the accompanying drawings, forming part hereof, Figure 1 is a top view of my veterinary dental float, the handle being broken away at the center to reduce the length of the illustration. Fig. 2 is a longitudinal central section perpendicular to the axes of the grinding-rollers. Fig. 3 is a longitudinal central section parallel with the axes of the grinding-rollers. Fig. 4 is a cross-section on line 4 4 in Fig. 3, and Fig. 5 is a cross-section on line 5 5 in Fig. 3.

A is the handle, longitudinally through which passes the driving-shaft B, provided with an eye $a$ at its outer end for connection with a power device for rotating the shaft. The head C of the float, which is supported by the handle A, is a rectangular frame, in the side bars $b\ b'$ of which are mounted the pairs of grinding or cutting rollers D D' and $D^2\ D^3$. The shafts of the rollers pass through the side bar $b'$ and have mounted on their ends outside of the side bar spur gear-wheels $c$, which are meshed together. At the inner end of the side bars $b\ b'$ is a cross-shaft E, provided with a gear-wheel $d$, which meshes with the gear-wheel $c$ on the shaft of the roller D. The shaft E is driven by the main driving-shaft B through bevel gear-wheels $e$.

F is a guard-plate which slips over the head C and has turned-over edges $f\ f'$, the turned-over edge $f$ covering the gear-wheels $c\ d$ and also covering the edge of the side bar $b'$, while the turned-over edge $f'$ covers the edge of the side bar $b$. These turned-over edges $f\ f'$, besides covering the parts, as stated, rise above the grinding-rollers and form between them a channel for guiding the float in its use. An additional guard-plate $g$ is employed to cover the shaft E and gear-wheels $e$.

What I claim is—

1. A veterinary dental float having a plurality of grinding or cutting rollers arranged in a horizontal series at right angles to the handle of the float, substantially as set forth.

2. In a veterinary dental float, the combination with a handle and a driving-shaft supported thereby and extending longitudinally thereof, of a head supported by the handle and carrying a plurality of transversely-arranged grinding or cutting rollers connected with said driving-shaft and arranged in a horizontal series at right angles thereto, substantially as set forth.

3. In a veterinary dental float, the combination with a handle and a driving-shaft supported thereby and extending longitudinally thereof, of a head supported by the handle, a plurality of transversely-arranged grinding or cutting rollers supported by the head and connected together by a train of gearing, and bevel-gears for transmitting motion from the driving-shaft to the roller-train, substantially as set forth.

4. In a veterinary dental float, the combination with the head, of the plurality of transversely-arranged grinding or cutting rollers, gears for communicating motion to said grinding or cutting rollers, and a guard or guards for covering the movable parts except the grinding-surfaces of the rollers, substantially as set forth.

5. In a veterinary dental float, the combination with the plurality of transversely-arranged grinding or cutting rollers, of the guard-plate F having raised portions $f$ $f'$ forming a channel in which the grinding or cutting rollers are located, substantially as set forth.

6. In a veterinary dental float, the combination of the handle A, shaft B, head C, rollers D D' D² D³, gears $c$, shaft E, gears $d$, and gears $e$, substantially as set forth.

This specification signed and witnessed this 13th day of July, 1900.

ROBERT W. ELLIS.

Witnesses:
JNO. R. TAYLOR,
ARCHIBALD G. REESE.